United States Patent [19]
Joo et al.

[11] Patent Number: 5,699,335
[45] Date of Patent: Dec. 16, 1997

[54] SPINDLE MOTOR DRIVER

[75] Inventors: Seong-sin Joo, Suwon-city; Seung-ill Lee, Kangwon-do, both of Rep. of Korea

[73] Assignee: Samsung Electronics Co., Ltd., Kyungki-do, Rep. of Korea

[21] Appl. No.: 581,410

[22] Filed: Dec. 29, 1995

[51] Int. Cl.$^6$ .............................. G11B 7/00; G11B 19/26
[52] U.S. Cl. ................. 369/50; 369/44.28; 369/44.29; 369/44.35; 360/73.03
[58] Field of Search ............... 369/47, 50, 44.27, 369/44.28, 44.29, 44.35, 189, 190, 239, 240, 267; 360/73.03

[56] References Cited

U.S. PATENT DOCUMENTS

| | | | |
|---|---|---|---|
| 4,855,978 | 8/1989 | Kanawaru | 360/73.03 |
| 5,051,976 | 9/1991 | Kawano | 360/73.03 |
| 5,425,014 | 6/1995 | Tsuyuguchi | 369/54 |

FOREIGN PATENT DOCUMENTS

| | | | |
|---|---|---|---|
| 290538 | 10/1994 | Japan | 360/73.03 |

*Primary Examiner*—Aristotelis M. Psitos
*Assistant Examiner*—Alan Faber
*Attorney, Agent, or Firm*—Sughrue, Mion, Zinn, Macpeak & Seas, PLLC

[57] ABSTRACT

A spindle motor driver is provided. The spindle motor driver includes a spindle motor for rotating an optical disc, an optical head for reading signals from the optical disc to reproduce the information recorded on the optical disc, a processor for processing the detected signals, and a constant linear velocity (CLV) servo for controlling the spindle motor to rotate with a CLV according to the signal processed by the processor. A constant angular velocity (CAV) servo is connected in parallel to the CLV servo to control the spindle motor to rotate with a CAV when the optical head performs jumping. Additionally, a feedback loop is provided between the spindle motor and the CAV servo for feeding back the rotation speed signal of the optical disc. A switching means selectively connects the processor with the CAV servo and the CLV servo. Thus, access time of the optical head can be effectively shortened.

4 Claims, 2 Drawing Sheets

SPINDLE MOTOR DRIVER

BACKGROUND OF THE INVENTION

The present invention relates to a spindle motor driver employed for an optical head of a disc player, and more particularly, to a spindle motor driver which is capable of shortening access time necessary for the optical head to jump to a desired track.

In general, when information is recorded or reproduced on or from a compact disc, every track of the compact disc travels with a constant linear velocity (CLV). That is, when recording/reproducing the information on a recording surface of the compact disc, a rotation speed of the spindle motor is varied according to a track position. In the case that the information recorded on the compact disc is sequentially reproduced from an inner portion of the compact disc to an outer portion thereof, the optical head moves by a predetermined distance corresponding to a width of each track, thus rotation speed of the spindle motor can be calculated in advance and controlled.

On the other hand, when an external signal for jumping the optical head to another specific track from a currently travelled track is input, rotation speed of the disc is sharply varied. Here, when the optical head jumps to seek for the specific track, the spindle motor should be stopped and restarted after the specific track sought for is found. Accordingly, an access time from the jump of the optical head to a reproducing point of time at the specific track is lengthened.

Referring to FIG. 1, such a conventional spindle motor driver will be described as follows.

An optical disc 1 used as an information recording medium is rotated by a spindle motor 20. An optical head 3 for projecting light onto optical disc 1 and detecting the light reflected from optical disc 1 is provided perpendicularly to the recording surface of the optical disc. Optical head 3 projects light onto the recording surface of optical disc 1 while travelling in a radial direction of optical disc 1. A radio frequency (RF) reproducing signal and an error signal including a focusing error signal and a tracking error signal, are detected from the light reflected from optical disc 1 by optical head 3. Here, the detected RF signals pass through a signal processor circuit 5 to be processed in a known method and then output. A phase lock loop (PLL) circuit is branched between signal processor circuit 5 and optical head 3, for controlling a phase of the detected signals and that of signal processor circuit 5 to be synchronized with each other. Part of the signals output from signal processor circuit 5 are transmitted into a reproduction region through a digital-to-analog (D/A) converter 7 and then converted into an analog signal, while the remaining part thereof is transmitted into a processor 11 to be used as a rotation sync signal ($f_c$). Processor 11 receives an external reference sync signal ($f_s$), compares the rotation sync signal ($f_c$) with the reference sync signal ($f_s$), and then outputs the result into a CLV servo 13. CLV servo 13 controls the rotation speed of spindle motor 20 to maintain the linear velocity of the track where optical head 3 is located. That is, since when optical head 3 reproduces the information while sequentially travelling each track, the rotation sync signal ($f_c$) transmitted to processor 11 maintains stable, so that the signal processed by processor 11, then transmitted to CLV servo 13 is regular. Accordingly, the rotation speed of spindle motor 20 becomes gradually lower and the CLV can be maintained.

However, when an external order for reproducing the information of another specific track is input to optical head 3, optical head 3 jumps to the specific track to seek for a groove where the track information is recorded. Here, since the rotation angular velocity of spindle motor 20 corresponding to the specific track is sharply varied, it is impossible to control the rotation speed of spindle motor 20 by CLV servo 13. As a result, spindle motor 20 should be stopped until the seeking is completed.

FIG. 2 is a graph showing access time of a spindle motor according to each step.

When the optical head, during reproduction of the information recorded on a disc track where the rotation speed of spindle motor 20 is N1, receives an external order for seeking for a specific track at a point of time "A", CLV servo 13 turns off and, at the same time, the optical head jumps to the specific track corresponding to the seek-order. Here, the optical head moves for a period of time "$t_{PM}$" to reach a point of time "B", while the optical disc has the rotation speed similar to the rotation speed N1 by rotational force of inertia. At the point of time "B", CLV servo 13 turns on, and the spindle motor is accelerated to reach near a rotation speed N2 with respect to the specific track. Here, a saturated acceleration time "$t_{as}$" is required. Then, the information of the specific track can be reproduced after a linear servo time "$t_L$" for maintaining CLV, a PLL lock time "$t_{PLL}$" and a setting time "$t_s$" for stably rotating the spindle motor are passed. Here, the access time represents a period of time obtained by adding the time period "$t_{PM}$" to a spin-up time "$T_{su}$" of the CLV servo which is a sum of "$t_{as}$", "$t_L$", "$t_{PLL}$" and "$t_s$". Accordingly, the period of time from the movement the external order is received to the stabilization of the spindle motor is lengthened.

SUMMARY OF THE INVENTION

Accordingly, it is an object of the present invention to provide a spindle motor driver for effectively shortening an access time.

To accomplish the above object, there is provided a spindle motor driver for controlling the rotation of an optical disc having information recorded thereon, the spindle motor driver comprising a spindle motor for rotating the optical disc, an optical head for detecting signals from the optical disc to reproduce the information recorded on the optical disc, a processor for processing the detected signals, and a constant linear velocity (CLV) servo for controlling the spindle motor to rotate with a CLV according to the signals processed by the processor, further comprising:

- a constant angular velocity (CAV) servo located in parallel to the CLV servo to control the spindle motor to rotate with a CAV when the optical head performs jumping; a
- a feedback loop provided between the spindle motor and the CAV servo for feeding back a rotation speed signal of the optical disc; and
- a switching means for selectively connecting the processor with the CAV servo and the CLV servo.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
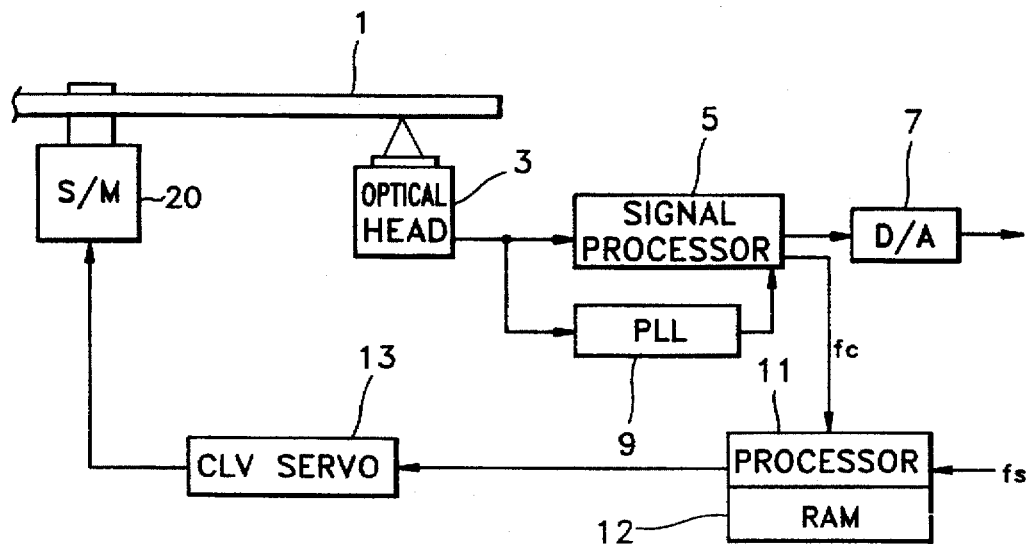
FIG. 1 is a block diagram showing a conventional spindle motor driver.
Figure 2:
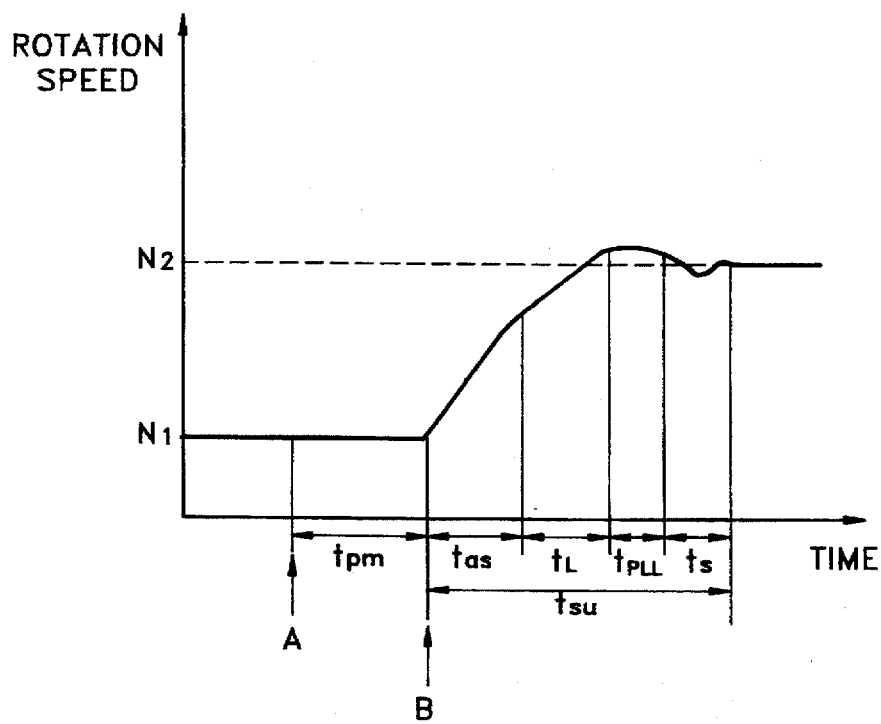
FIG. 2 is a graph showing an access time, when an optical head jumps to an arbitrary track, in the conventinal spindle motor driver shown in FIG. 1.
Figure 3:
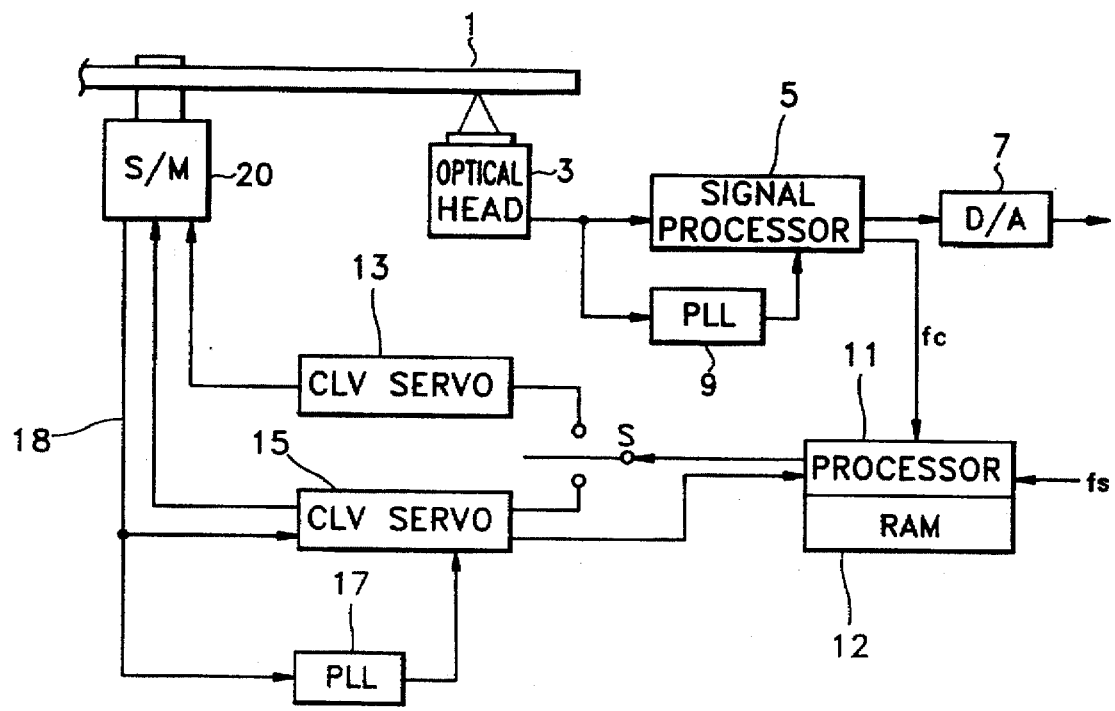
FIG. 3 is a block diagram showing a spindle motor driver according to the present invention.

Referring to FIG. 3, an optical disc 1 having information recorded thereon is connected to and rotated by a spindle motor 20. Here, since every track of optical disc 1 has constant recording density, the rotation speed of spindle motor 20 is controlled such that optical disc 1 is rotated with CLV. In order to reproduce the information from a recording surface of optical disc 1, an optical head 3 for forming an optical spot onto the recording surface of optical disc 1 is located on a position opposite to the recording surface of optical disc 1. RF signals detectd by optical head 3 are processed by a PLL circuit 9 and a signal process circuit 5. Part of the signals processed through signal process circuit 5 is input to a D/A converter 7, and converted into an analog signal. The converted analog signal drives an actuator (not shown) for optical head 3. The rest of the signals processed through signal processor circuit 5 is input to a processor 11 as a phase sync signal ($f_c$). Processor 11 is connected to a RAM 12 to allow input/output of signals. Processor 11 compares the phase sync signal ($f_c$) with a phase reference signal ($f_s$), and then outputs the result to an input port of a CLV servo 13 through a switch S.

When optical head 3 reproduces the information of optical disc 1, the switch S is connected to CLV servo 13. Thus, angular velocity of spindle motor 20 is gradually lowered, so that optical disc 1 maintains the CLV.

On the other hand, when optical head 3 jumps to a specific desired track according to an external seek-order, switch S is switched from CLV servo 13 to a constant angular velocity (CAV) servo 15 for driving spindle motor 20 with a CAV, independently of a reproduction position of optical head 3. Accordingly, while optical head 3 moves to seek for the specific track on disc 1 according to the seek-order, spindle motor 20 rotates with the CAV. The angular velocity is determined according to the later-described formula.

Here, a feedback loop 18 is provided between spindle motor 20 and CAV servo 15 to feed back a rotation speed signal of spindle motor 20 to processor 11 via CAV servo 15. A PLL circuit 17 is branched between loop 18 and CAV servo 15 to adjust the phase of the rotation speed signal.

Figure 4:
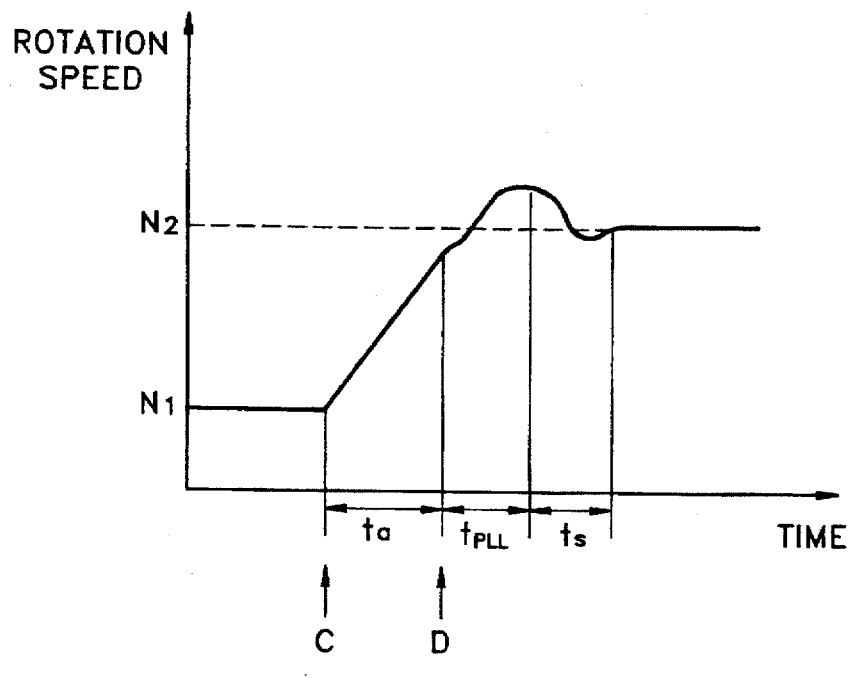
FIG. 4 is a graph showing an access time, when an optical head jumps to an arbitrary track, in the spindle motor driver according to the present invention.

Referring to FIG. 4, an access time in the spindle motor driver as described above will be described. When an external seek-order is input at a point of time "C" at which spindle motor 20 has a rotation speed N1, switch S is switched from CLV servo 13 to CAV servo 15, so that CLV servo 13 turns off and CAV servo 15 turns on.

An optical disc usually rotates with the CLV of 1.2 to 1.4 m/s. The angular velocity ω of the optical disc corresponding to the linear velocity will be expressed as follows:

$$\omega = \frac{v}{r + (d \times n)}$$

where v indicates linear velocity of the optical disc, r indicates a radius of a read-in region of a track, d indicates an interval between adjacent tracks, and n indicates the number of the track. Here, since the number of a track in the position "C" and the radius r of the read-in region of the track can be counted from the track pattern of the optical disc, and the interval d of the tracks and the linear velocity v are constants, the angular velocity in the position "C" can be easily calculated. Similarly, when the optical head jumps to a specific track according to the seek-order, the angular velocity with respect to the specific track can be easily calculated.

CAV servo 15 controls spindle motor 20 to rotate at the rotation speed corresponding to the calculated angular velocity during a time period "$t_a$" while optical head 3 is jumped according to the seek-order.

That is, the rotation speed of spindle motor 20 increases or decreases to maintain the CAV during the period time "$t_a$".

At a point of time "D" where optical head 3 has jumped to the specific track, switch S is switched such that CAV servo 15 turns off and CLV servo 13 becomes turned on. Thus, spindle motor 20 rotates with the CLV. Here, since the CLV of the disc is proportional to the CAV thereof, the CAV can be easily converted into the CAV.

Thereafter, as in the conventional spindle motor driver, after a period of time "$t_{PLL}$" and a period of time "$t_s$" are passed, reproduction is performed with respect to the specific track.

As described above, according to the present invention, the rotation speed of a spindle motor is controlled while an optical head performs jumping, thereby shortening the access time of the optical head.

What is claimed is:

1. A spindle motor driver comprising a spindle motor for rotating an optical disc, an optical head for reading signals from said optical disc to reproduce information recorded on said optical disc, a processor for processing the detected signals, and a constant linear velocity (CLV) servo for controlling said spindle motor to rotate with a CLV according to the signals processed by said processor, said spindle motor driver further comprising:

a constant angular velocity (CAV) servo operable to control said spindle motor to rotate with a CAV when said optical head performs track jumping; and switching means for selectively connecting said processor with said CAV servo and said CLV servo.

2. A spindle motor driver according to claim 1, wherein said switching means connects said processor to said CLV servo while said optical head reads said optical disc, and to said CAV servo while said optical head performs jumping.

3. A spindle motor driver according to claim 1, further comprising a feedback loop coupled between said spindle motor and said CAV servo.

4. A spindle motor driver according to claim 3, further comprising a phase lock loop (PLL) circuit branched between said feedback loop and said CAV servo for supplying a phase lock signal to said CAV servo.

* * * * *